United States Patent [19]
Beaton

[11] Patent Number: 5,388,365
[45] Date of Patent: Feb. 14, 1995

[54] BRANCH LINE DEPLOYMENT MECHANISM

[75] Inventor: Rodger A. Beaton, Umina, Australia

[73] Assignee: Webmac Nominees Pty Limited, North Ballarat, Australia

[21] Appl. No.: 137,160

[22] PCT Filed: Apr. 16, 1992

[86] PCT No.: PCT/AU92/00176
§ 371 Date: Oct. 19, 1993
§ 102(e) Date: Oct. 19, 1993

[87] PCT Pub. No.: WO92/18000
PCT Pub. Date: Oct. 29, 1992

[30] Foreign Application Priority Data
Apr. 19, 1991 [AU] Australia .............. PK5729

[51] Int. Cl.6 ............................................. A01K 81/04
[52] U.S. Cl. ........................................................ 43/6.5
[58] Field of Search ............ 43/6.5, 4, 4.5, 27.4, 43/15

[56] References Cited

U.S. PATENT DOCUMENTS 3,466,785  9/1969  Shook ................... 43/27.4
3,710,499  1/1973  Tadano .................. 43/6.5
4,354,667 10/1982  Svendsen ................. 43/8
4,453,330  6/1984  Jorgensen-Dahl ........ 43/27.4
4,630,388 12/1986  Furlong ................. 43/27.4
5,165,194 11/1992  Jansson ................... 43/4

FOREIGN PATENT DOCUMENTS 1405172  7/1975  United Kingdom ......... 43/27.4

Primary Examiner—P. Austin Bradley
Assistant Examiner—Chuck Y. Mah
Attorney, Agent, or Firm—Abelman, Frayne & Schwab

[57] ABSTRACT

This invention relates to the deployment of branch lines used in longline fishing. A branch line deployment mechanism is provided which comprises deployment means for casting a baited branch line and drive means associated therewith. The deployment means comprises an arm connected at one end to the drive means, having at its other end means associated therewith to accommodate a baited line, such that the arm is capable of rotation about said connected end. The rotation is imparted to the arm intermittently by the drive means so as to provide a first or loading period in which the arm may be loaded with a baited line and a second or throwing period in which the arm casts the baited line.

12 Claims, 3 Drawing Sheets

BRANCH LINE DEPLOYMENT MECHANISM

FIELD OF THE INVENTION

This invention relates to the deployment of branch lines used in the so-called longline fishing industry. In particular, it relates to mechanical means to deploy branch lines with bait attached from a fishing vessel.

Whilst the invention may be equally well suited to a variety of other fishing methods and even locations, for convenience, the following description refers to the use of the inventive device in longline fishing. Any reference however to the use of the invention in such longline fishing is meant to encompass any form of fishing, where by suitable adaptation, the invention may be so used. Similarly, the device of the invention lends itself to the casting of other materials or substances besides bait, with or without lines attached and accordingly it must be understood that the invention is not limited solely to longline fishing or even to fishing in general.

PRIOR ART

The longline fishing technique is specifically utilised for tuna fishing. In this method, for example, each ship deploys up to 3,000 branch or tracer lines, each with baited hooks. The ship travels for say five hours at approximately 20 kph, feeding out the so-called longline (main line) which extends up to 100 kilometers. Each branch line is spaced approximately 33 meters apart, along the main line. Thus, a branch line is baited, attached to the main line and cast approximately at six second intervals. In other words, a branch line is cast every four to ten seconds for approximately five hours before the ship turns around, to retrace its path and bring in the main line and hopefully the day's catch.

A team of four or five people performs the function of casting the branch lines, which is necessarily labour intensive. One person selects the branch line, a second baits the line, a third deploys the line whilst a fourth clips the line onto the main line, which is fed into the sea from the rear of the ship.

Although the length of each branch line is 40 to 70 meters, it is only necessary to cast the line beyond the wake or turbulence of the ship. Thus, a minimum throw of some 12 to 15 meters is required. The bait typically weighs 100–300 grams.

The branch lines are cast from the stern of the ship on the port (left) side only. Casting to the port side results from right-handed throwing from a person standing at the stern of the ship. This manual deployment of branch lines contributes to significant reductions in fishing efficiency. Port side only branch line deployment, particularly when throwing into the wind, causes many of the baited branch lines to encounter the turbulence of the boat rather than be cast beyond it.

Since the bait does not sink quickly in these circumstances, it allows sea birds access to the baited hooks which, it is estimated, costs the Japanese fishing industry in southern waters alone a minimum of A$7 million annually in lost fishing effort. Sea birds, particularly albatrosses, also get caught on the baited hooks. This is itself becoming a serious conservation issue that could potentially threaten the fishing industry. Furthermore, gear damage and loss is also high when manual deployment is thus necessarily confined to the port side, only to be aggravated by the effects of strong winds and sea turbulence resulting in fouled lines, including their entanglement with propellers.

The present invention has therefore been conceived out of the need to mechanise branch line deployment in order to significantly reduce loss of bait to birds, minimise the mortality rate of sea birds including albatrosses, and reduce gear damage and loss. In addition, mechanisation would allow larger, more fuel efficient propellers to be utilised since at present, ships' operations have been compromised in order to reduce gear damage and bait loss arising from manual port side deployment of branch lines.

It will be readily appreciated that operating efficiency is vital in this industry where there is limited access to the resource being fished. Furthermore, the variability in deployment efficiency by individual crew members, contributing significantly to the problems noted above, would be largely overcome through mechanisation. At the very least, the present invention provides an alternative to previously proposed systems.

DISCLOSURE OF THE INVENTION

According to the present invention there is provided a branch line deployment mechanism for use in longline fishing comprising deployment means for casting a baited branch line and drive means associated therewith, wherein the deployment means comprises an arm connected at one end to the drive means, having at its other end means associated therewith to accommodate a baited line, such that the arm is capable of rotation about said connected end, rotation being imparted to the arm intermittently by the drive means so as to provide a first or loading period in which the arm may be loaded with a baited line and a second or throwing period in which the arm casts the baited line. Means to rotate the arm in either direction, that is, clockwise or counter-clockwise, is preferably provided in the mechanism.

Preferably during the first or loading period the arm remains essentially stationary to facilitate loading.

In order to accommodate the baited line, the arm, at least in the region associated with its outer free end, may be of generally U-shaped cross-section thereby providing a channel or recess along its axis to hold the baited line prior to casting it. Alternatively, the arm may be relatively flat in cross-section, having the appearance of a paddle, with a blade approximately perpendicular to a support plate mounted to cooperate with the arm, so that in use the baited line can be placed on the plate, the arm being caused to sweep over the surface of the plate as it is rotated in order to cast the line. Naturally the plate may also be provided as an optional facility even where the U-shaped channel is utilised, in order to catch misplaced bait etc.

With advantage the axis of rotation of the arm is provided at an angle to the vertical, for example between 5° and 20° to the vertical, so as to provide sufficient lift to ensure the baited line is cast an appropriate distance. Furthermore, it is preferred that the arm itself also be angled between 5° and 20° with respect to the plane perpendicular to the axis of rotation. If the unit and the arm are thus equally angled as indicated, then the arm will in one sector of its rotation be substantially horizontal, hence providing a convenient position for loading, whilst elsewhere in its travel about the axis will provide an upward sweeping motion to facilitate casting.

Preferably the deployment mechanism is provided with attachment means (for example a bracket) for attaching it to a fishing vessel and more preferably externally thereof. The deployment mechanism is also preferably provided with a gimbling arrangement of known means associated with said attachment means to facilitate keeping the mechanism level despite the roll of the ship.

When the mechanism is thus situated or mounted external of the ship, with the axis of rotation angled towards the ship and with an equally angled arm as discussed above, such that the then horizontal loading position is adjacent the stern, loading is further facilitated and the throwing action then conveniently simulates manual throwing. However this mechanical throwing is of course achieved with greater precision, control and effective distance when compared to manual throwing. Additionally, where the rotation of the arm may be effected in either direction, it may be made to do so depending on the prevailing weather conditions, thus causing the bait to be cast to the port or starboard side as required, by means of suitable reversal of the drive means.

The drive means for the mechanism may be any suitable drive capable of imparting sufficient rotational velocity to the deployment arm so as to cast or throw the baited line beyond the turbulence of a fishing vessel on which it is used. Furthermore it is required that the drive to the arm be capable of interruption so as to provide a period for loading it with the baited line.

The throwing action may be achieved for example by simply accelerating the arm and bringing it to a sudden halt thus causing the baited line to continue by virtue of its momentum. This arrangement also provides a loading period whilst the arm is held stationary prior to releasing it for the next throw. Alternatively, the throwing action may be achieved by rotating the arm within a guide mechanism provided with an opening in the form of a gate or aperture or the like, such that when the arm passes the opening, the baited line is caused to be flung therefrom. Even without a guide, if sufficient angular velocity is achieved, a threshold will be passed and the baited line will of itself be thrown clear of the arm. In either of these latter situations however, the arm would still need to be brought to rest or decelerated to allow subsequent reloading.

The arm is conveniently and automatically locked in its stationary loading position, for example, by means of a cam follower, which is caused to engage with a cam on a shaft which supports the arm and about which the arm rotates. Release of the cam follower and hence the arm is achieved by activating a release mechanism therefor, preferably a hydraulic release mechanism.

Alternatively, engagement may be achieved by means of a hydraulic release ram acting in cooperation with a peg or lug located on a suitable position about the periphery of the drive shaft, for example on a plate affixed about the shaft which supports the arm.

Referring to the drive means, one suitable drive mechanism for example is provided by a conventional motor which cooperates with a tensioning spring associated with the arm, so that in use, the arm is locked or held in position by suitable means such as those described above, thus causing the motor to operate against the spring thereby tensioning it until the motor reaches its stall position, whereupon the spring may be released causing the arm itself to accelerate and cast the bait as described above. When the arm is brought to rest, for example by using a cam follower acting against a cam to act as a lock or by using a ram acting directly on a suitable lug, the spring will again be wound up by the action of the motor thereon. Bait may then be loaded and the operation repeated.

Whilst the aforementioned motor/spring arrangement does allow reversal of the direction of rotation, this may not be especially convenient since, in general, reversal will be best achieved by not only reversing the motor (usually relatively easy), but also by replacing the spring with one of appropriate opposite hand. Otherwise the spring will be placed in extension rather than compression and is more likely to fail.

Alternatively, with advantage, the drive means may be provided by a hydraulic motor which drives the arm either directly in conjunction with a hydraulic accumulator or via a clutch mechanism. In the first situation, if the arm were unimpeded, it would rotate freely with the motor. However if it is engaged, for example by means of a cam follower cooperating with a cam to lock it in one position or by means of a hydraulic ram and lug arrangement, then the hydraulic motor builds up pressure, and the pressure is stored in a hydraulic accumulator (comprising for example a piston) by known means. By releasing the cam follower or hydraulic ram as required, the arm is released or disengaged, and there is provided an immediate acceleration to the arm facilitated not only by the pressure in the motor itself but assisted by the pressure built up in the accumulator.

In the second situation, where a clutch is provided, and engagement of the arm is effected as described above (is locking the arm in the loading position), the clutch is triggered at the same time as the release mechanism is activated, thereby causing the arm which is now otherwise free to rotate, to be thus rotated with the motor.

By analogy with the previous embodiment using a motor/spring arrangement, the hydraulic accumulator or clutch arrangement substitutes for the spring arrangement. In these latter embodiments however it will be readily appreciated that reversal of the direction of rotation of the arm is more readily and simply achieved by reversing only the hydraulic motor.

Thus by using the hydraulic motor, for approximately one half of a single rotation following its release, the arm is caused to accelerate by the rotational force exerted by the motor, whilst for the remaining half it rotates freely with the motor in equilibrium until it is made stationary by engagement of the cam follower in the appropriately shaped cam or engagement of the hydraulic ram with a suitable lug. Either the pressure thus experienced in the motor is stored as described above in an accumulator or a clutch allows the motor to rotate freely. In either case, the motion exhibited by this action is in fact quite smooth and is considerably less violent than the use of the conventional motor/spring mechanism discussed above.

BRIEF DESCRIPTION OF THE DRAWINGS

An embodiment of the invention will now be described by way of illustration only with reference to the drawings, in which.

DESCRIPTION OF THE PREFERRED EMBODIMENT OF THE PRESENT INVENTION AND BEST MODES OF CARRYING OUT THE INVENTION

Figure 1:
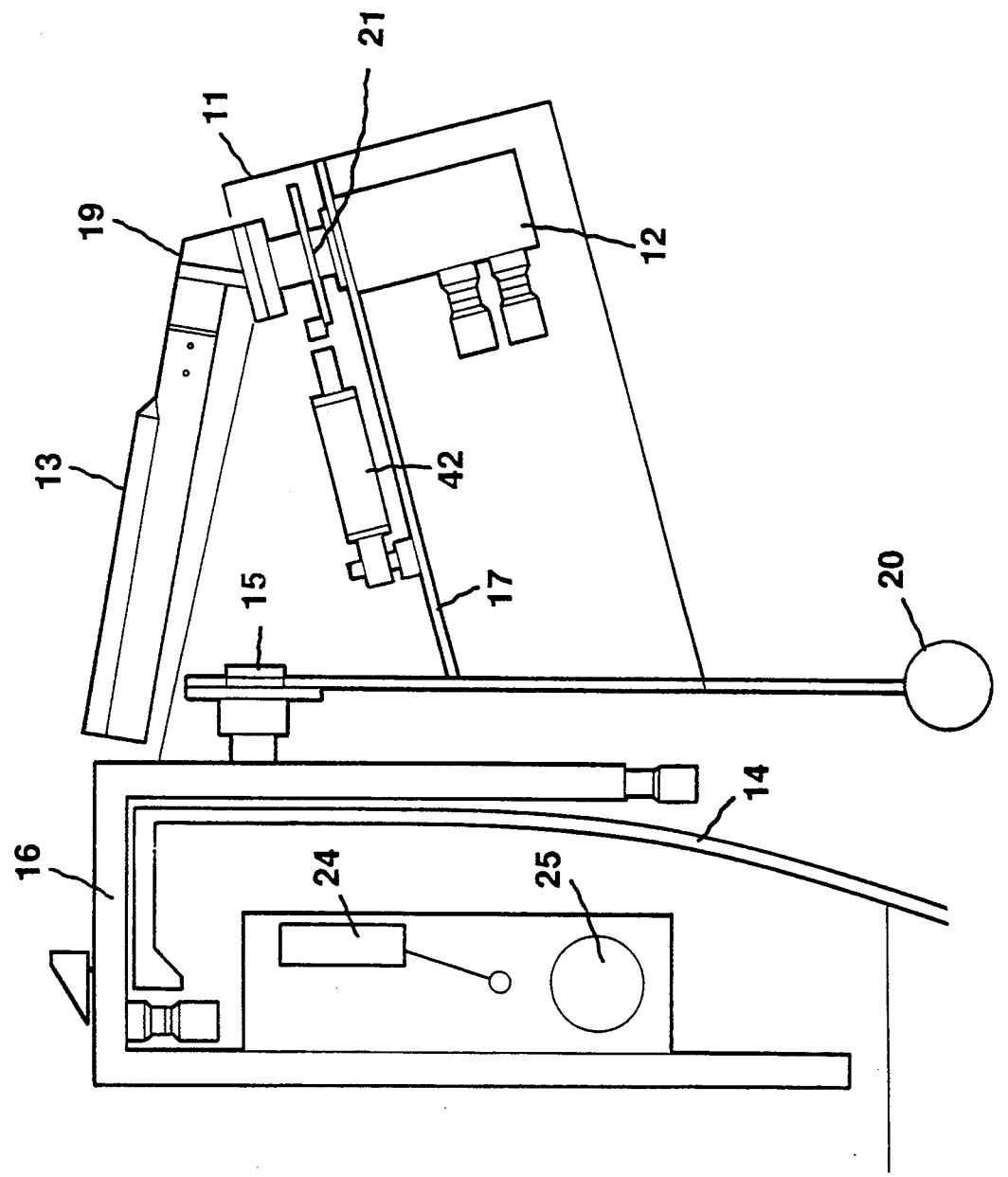
FIG. 1 shows an embodiment of a branch line deployment mechanism according to the invention in side elevation.

Referring to FIG. 1 there is shown a branch line deployment mechanism generally referenced 11 comprising a hydraulic motor 12 and a deployment arm 13.

Figure 2:
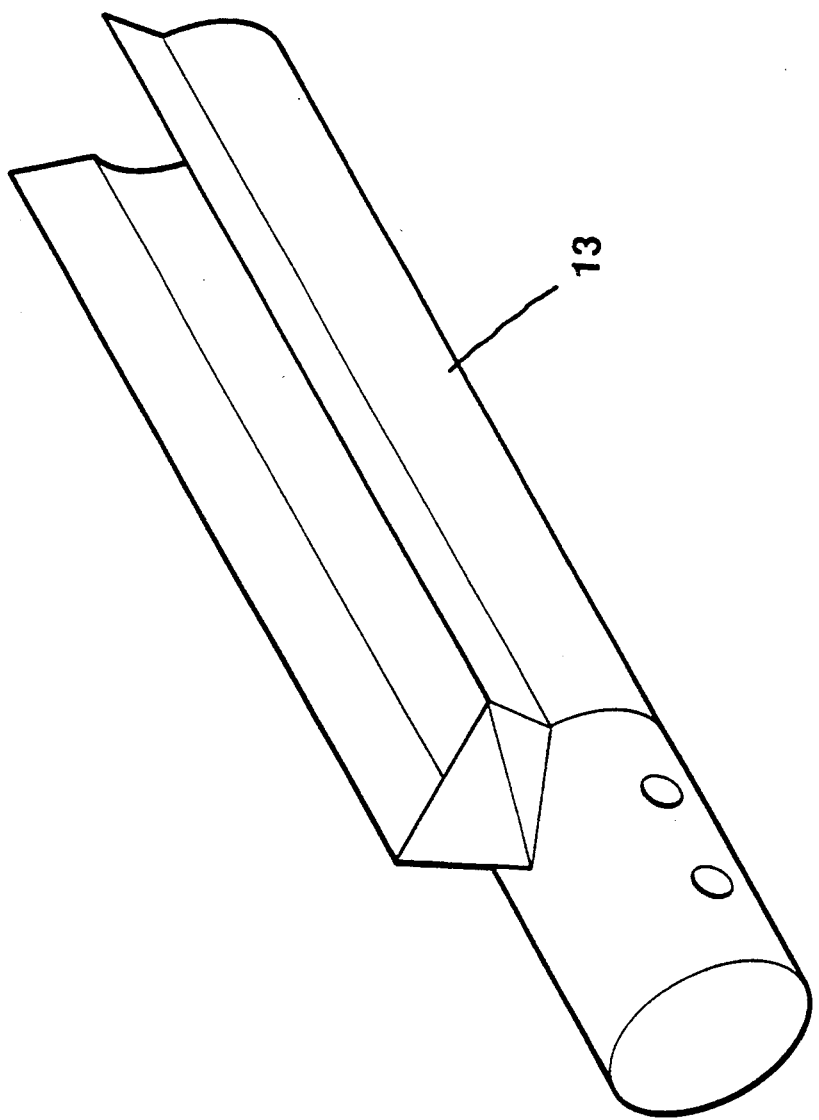
FIG. 2 is a detail of an arm suitable for use in the embodiment as illustrated in FIG. 1.

The device 11 is attached to the stern of a ship 14 by means of a gimbling system 15 (with counter weight 20) of known type via bracket 16. The gimbling system 15 provides for level operation of the deployment mechanism 11 despite roll of the ship. Extending rearwardly from the gimbling mechanism 15 is support arm 17 to which is attached the hydraulic release mechanism generally referenced 42. The hydraulic motor 12 is mounted on the underside of support arm 17. Hydraulically connected to motor 12 by means of directional valve 24 is a hydraulic accumulator 25. The motor 12 provides direct drive to the arm 13 via collar 19 which is mounted on the drive shaft 21 of the motor 12. An example of a suitable U-shaped arm 13 is shown in FIG. 2.

Figure 3:
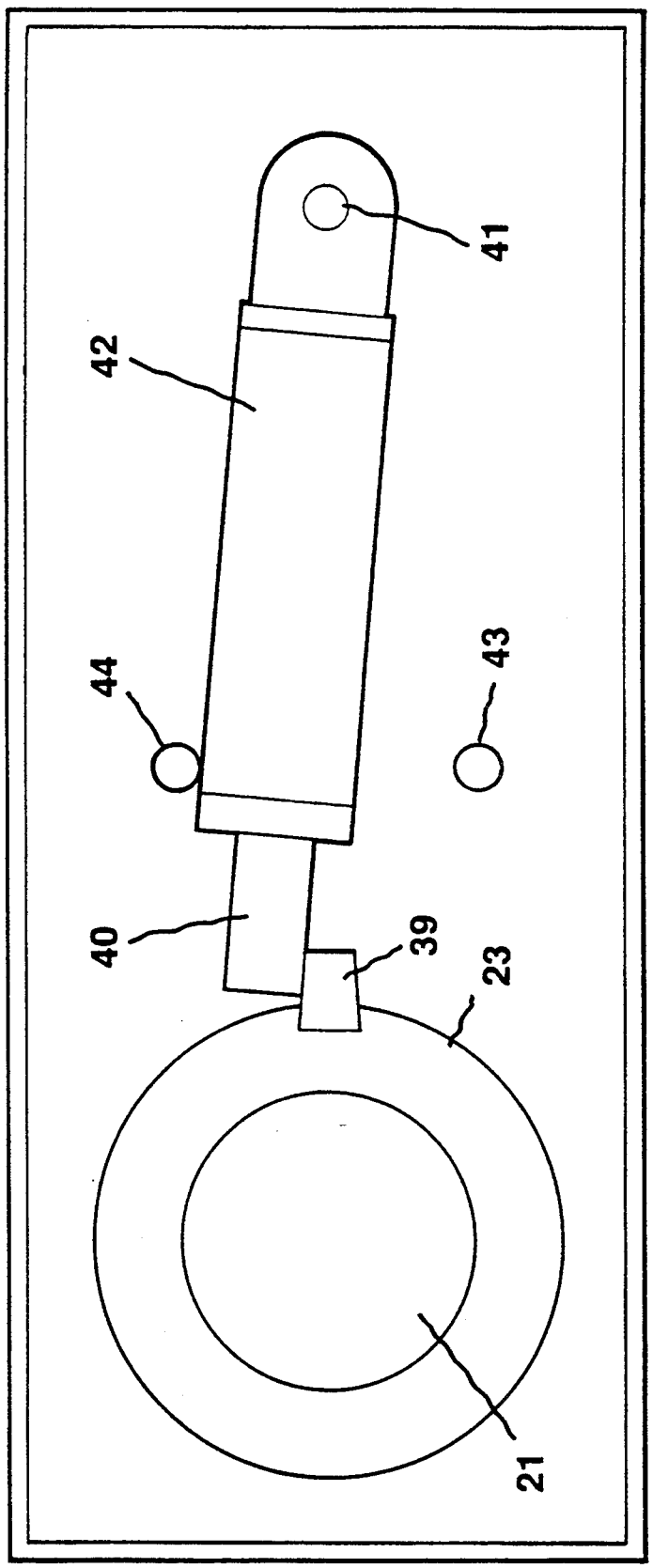
FIG. 3 is a detail of a hydraulic release mechanism for actuating the mechanism based on a ram acting directly on a suitable lug.

FIG. 3 shows in detail the release mechanism 42 and associated plate 23, which is mounted on drive shaft 21. Plate 23 incorporates a pin or lug 39 which is held against a ram 40 in order to lock plate 23 at one point of its rotation. Ram 40 with its associated hydraulic cylinder 42 is pivoted about axis 41 and is itself restrained from lateral movement by means of stops 43 and 44. Although hydraulic ram 40/42 need not be pivoted, it has been found useful to do so to facilitate stopping the plate 23 and hence arm 13, at the same position (i.e. relative to the stern of the ship) in order to load at the same location irrespective of whether port or starboard deployment is utilised. If ram 40/42 were not pivoted, lug 39 would be caused to stop either side of the ram 40, effectively shifting the loading position.

Thus in use, actuation of the hydraulic release cylinder 42 allows disengagement of the ram 40 (through withdrawal or retraction thereof) from the lug 39, with the consequent rotation of arm 13 (which is driven by motor 12). Upon one rotation thereof, ram 40 will again engage with lug 39 by virtue of ram 40 being allowed to resume its normal or locking position.

Therefore, utilising the above described release mechanism, the deployment mechanism 11 allows for the loading of the deployment arm 13 in the locked position when the arm 13 is conveniently adjacent the stern 14 of the ship. The hydraulic release mechanism 42 may be actuated to allow rotation of the arm 13 thereby causing the baited line to be cast. After one rotation of the arm 13 it is again locked in position by means of the ram 40 as described above. The drive motor 12 continues to be supplied with oil thereby building up pressure therein, the overflow of which is accommodated in the hydraulic accumulator 25. After loading arm 13 with the baited line, the release mechanism 42 may be again actuated causing the arm 13 to be once again rotated by means of the pressure exerted by the driving motor 12 and hydraulic accumulator 25.

Although it is usually required that loading be achieved every six seconds, corresponding to the normal interval between each deployed branch line, it has been found that this equipment allows the reload time to be less than two seconds. Furthermore, reverse direction deployment to either the port or starboard side may be achieved within three seconds which allows the line setting process to continue uninterrupted despite changing direction. Mounting of the deployment mechanism to the ship by means of the gimbling arrangement allows compensation for roll, so branch line deployment direction and distance remain largely unaffected, irrespective of the sea conditions.

A finger touch manual firing mechanism (not illustrated) associated with the hydraulic release mechanism may be provided for efficient operation of the deployment mechanism so that line setting routines can be maintained.

The branch line deployment distance may be conveniently varied to a useful maximum of about twenty meters. Whilst the machine is capable of throwing for some fifteen to twenty-four meters, it is preferred to throw in the range of fifteen to eighteen meters. The distance of throw is reduced by restricting the flow of oil from the accumulator 25 to the motor 12.

Deployment direction may be conveniently set at any appropriate angle to the axis of the ship, although a deployment direction of 10° has been found to be suitable. With advantage, the equipment may be constructed from stainless steel for durability. Safety is enhanced since moving parts are outside the work area and may be shielded effectively from same. The straightforward design and the relatively few moving components permit for the efficient replacement of parts and maintenance of equipment. The equipment may be installed relatively quickly and is compatible with existing power sources.

From the foregoing, it will be readily apparent that numerous modifications and variations can be effected without departing from the true spirit and scope of the present invention. It will be understood that no limitation with respect to the specific embodiment illustrated herein is intended or should be inferred.

I claim:

1. A deployment mechanism for use in deploying a branch line in long line fishing, said deployment mechanism including:

a drive motor having a drive shaft;

an elongate deployment arm having a free end, and an opposite end connected to said drive shaft of said motor, for rotational movement of said free end of said deployment arm about a longitudinal axis of said drive shaft;

an axially extending channel being provided at the free end of said deployment arm for holding a baited line; and drive means for imparting an intermittent rotational moment to said deployment arm;

whereby in a first mode said deployment arm is held to allow for the loading of a baited line into said channel and in a second mode said drive means imparts a rotational moment to said deployment arm, so as to cast said baited line out of said channel and away from said deployment arm.

2. A branch line deployment mechanism as claimed in claim 1, wherein the drive means rotates the arm horizontally.

3. A branch line deployment mechanism as claimed in claim 1, wherein the drive means is capable of rotating in a clockwise direction or counter-clockwise direction.

4. A branch line deployment mechanism as claimed in claim 1, wherein the action of casting the baited line is achieved by accelerating the arm.

5. A branch line deployment mechanism as claimed in claim 1, wherein during the first mode or loading period, the arm remains essentially stationary to facilitate loading.

6. A branch line deployment mechanism as claimed in claim 1, wherein the drive means is a hydraulic motor.

7. A branch line deployment mechanism as claimed in claim 1, wherein the arm is engaged automatically in a stationary loading position and can be released therefrom by means of a hydraulic release ram acting in cooperation with a peg or lug located about the periphery of a drive shaft which supports the arm.

8. A branch line deployment mechanism as claimed in claim 1, wherein the channel is of a generally U-shaped cross-section extending along the axis of said arm.

9. A branch line deployment mechanism as claimed in claim 1, wherein the axis of rotation of said arm is provided at an angle to the vertical.

10. A branch line deployment mechanism as claimed in claim 1, wherein the arm is angled with respect to a plane perpendicular to the axis of rotation.

11. A branch line deployment mechanism as claimed in claim 1, wherein means are provided for attaching said mechanism to a fishing vessel.

12. A branch line deployment mechanism as claimed in claim 1, wherein the deployment mechanism is provided with gimbaling arrangement to facilitate keeping the deployment mechanism level despite any rolling of a ship.

* * * * *